Jan. 29, 1924.

W. F. LENT 1,482,237

COMBINED TIRE TEST GAUGE AND VALVE

Filed Dec. 7, 1922

Inventor:
Wilmar F. Lent, by
C. A. Mason Att'y.

Patented Jan. 29, 1924.

1,482,237

UNITED STATES PATENT OFFICE.

WILMAR F. LENT, OF NEW HAVEN, CONNECTICUT, ASSIGNOR TO THE GREIST MANUFACTURING COMPANY, OF NEW HAVEN, CONNECTICUT, A CORPORATION OF CONNECTICUT.

COMBINED TIRE TEST GAUGE AND VALVE.

Application filed December 7, 1922. Serial No. 605,426.

*To all whom it may concern:*

Be it known that I, WILMAR F. LENT, citizen of the United States of America, residing at New Haven, in the county of New Haven and State of Connecticut, have invented a certain new and useful Combined Tire Test Gauge and Valve, of which the following is a full, clear, and exact description.

This invention relates to tire test gauges and valves of the type which are combined in a single structure, and to be permanently attached to the usual valve stem or nipple of a pneumatic tire.

In particular the invention has reference to devices of the character above referred to, which comprise tire air pressure indicating means which may be so constructed as to be movable under pressure of the air within the tire only when such pressure is in excess of that amount which is calculated as the minimum safety pressure for the tire. At all pressures below the minimum safety pressure for the tire the gauge will fail to operate, and such failure will indicate that the tire pressure is below the minimum for safety, and hence that the tire requires inflating.

The present improvements comprise certain novel features in the design, including details of construction and combinations of parts, which result in simplicity of construction, and permit the device to be manufactured economically, as compared with prior constructions. These features will be apparent from the following description of a preferred form of the invention in connection with the accompanying drawings, and the novel elements and combinations will be pointed out in the appended claims.

Figure 1:
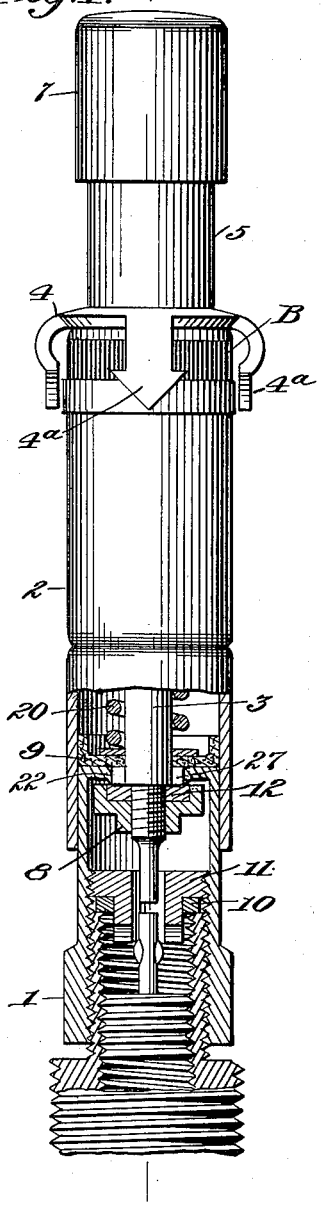
Fig. 1 represents the device in side elevation, with parts in vertical section.
Figure 2:
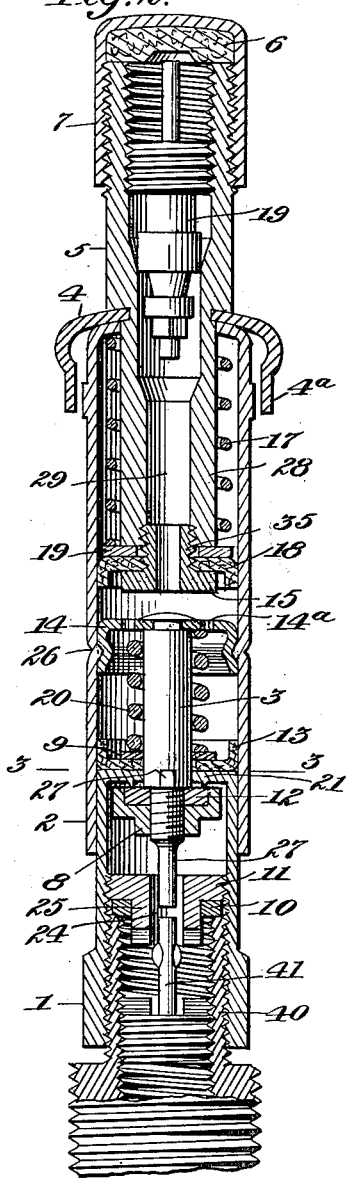
Fig. 2 is a vertical longitudinal section taken at right angles to Fig. 1.
Figure 3:
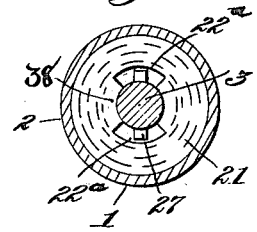
Fig. 3 is a transverse section on the line 3—3, of Fig. 2.

Referring to the drawings, the usual inflating valve-nipple 40, provided with internal and external screw threads, is equipped with the inflation valve, the stem of which 41 projects a suitable distance within the nipple. An internally screw-threaded tubular member 1 is adapted to be threaded onto the external thread of the nipple 40, the member 1 terminating at its upper end in an annular internal valve seat 21 inside of which is a key slot 22, the same being in a depressed portion, below the valve seat. A shouldered plug 11 is externally threaded to engage the internal thread of the member 1, said plug having a passageway 24 therethrough, which is partly in the main body portion of the plug, and partly in a reduced portion 25 thereof. A lead or other suitable gasket 10 is clamped between the body of the plug 11 and the upper end of the valve nipple 40, and the stem 41 of the tire valve extends partway through the passage 24. A tubular member 2 having a cylindrical bore of the same size as the outside of the member 1 telescopically slides over the latter. A partition 14, provided with apertures 14ª, is secured to the member 2 by indenting the metal of the said member and partition as shown at 26, and a plunger 3 is riveted within a central aperture in the partition. The plunger extends downwardly and is provided with a reduced threaded lower end for engagement with a valve 8, having a packing 12 and arranged to engage the valve seat 21. The lower end of the plunger 3 is reduced to form a stem 27 which, when the valve is closed, occupies a position slightly above the upper end of the tire valve stem 41. A leather washer 13 surrounds the plunger 3 and is held in position against the inturned portion of the member 1 which is provided with the valve seat 21, by a steel washer 9 and a spiral spring 20, which latter surrounds the plunger and bears at its upper end against partition 14. The plunger 3 is provided at diametrically opposite points with one or more projections 27 which are arranged in vertical alinement with enlarged portions 22ª of openings 22 in the valve seat. When the plunger and valve 8 are depressed to open the valve, a quarter turn of the plunger 3 will carry the projections 27 out of alinement with the enlarged portions 22ª and upon release of the plunger the spring 20 will hold the projections against the surfaces 38 thereby maintaining the valve open.

The upper portion of the member 2 is formed as a cylinder within which slides the piston of the tire gauge. Such piston comprises a hollow stem 28, provided with a bore 29 therethrough, and a leather washer 18 which is clamped between a metal washer 19 and head 15, the latter a part of a threaded tubular pipe section 35, which is likewise in threaded engagement with an internal thread in the bore 29. The upper portion 5, of the stem has fastened to it the indicating disc 4, having downwardly projecting arrows, or other pointing devices 4ª. The upper portion of the member 2 is provided externally with an annular band B which may be of red or other distinguishing color.

A spiral spring 17 surrounds the stem of the plunger 28 and has bearing at its lower end against the washer 19 and at its upper end against an inturned portion of the member 2. Said spring is so tensioned that air pressure below the plunger which is as low as or less than the minimum safety air pressure for the tire will not be sufficient to overcome the spring tension when valves 41 and 8 are open. If the pressure in the tire is sufficient, the arrows will rise slightly, and if the pressure is excessive the arrows will rise above the edge of the band B. The valve 8 is provided for preventing the escape of air from the tire in case the usual tire air valve should leak.

The upper portion of the stem 5 is internally threaded to receive the external thread on an ordinary tire valve 19, and the stem 5 is also externally threaded for engagement with an internal thread on a protecting cap or nipple 7, which has an internal sealing washer 6.

In the use of this device when it is desired to inflate the tire at a free air station, the cap 7 is removed, and the air chuck is applied to the end of the stem 5. Applying this chuck with the necessary downward pressure opens the valve 19, and at the same time releases the air within the chuck, the pressure in applying the chuck serving to depress the entire body portion 2 downward. This movement of the parts unseats the valve 8, and also causes the stem 27 to engage the stem 24 and open the tire air valve.

When it is desired to ascertain the pressure within the tire as inflation proceeds, the chuck is removed and the body depressed in the manner described above by grasping the body 2, thereby opening the valve 8 and tire valve, and the air from the tire will then have access to the piston 18, causing the latter to rise if tire air pressure is above the minimum.

When inflating the tire at a free air station, the operation described above of applying the air chuck opens the valve 8 and the tire valve. When the tire is inflated by means of an engine pump or a foot pump, it is necessary to provide some means to hold the valve open as the air hose under these conditions is applied for the time being to the stem 5 and no means is present to depress the body 2. By means of the projections 27, when the body 2 is depressed and partially rotated following depression, and released, the spring 20 will move said projections upwardly against the surfaces 38, thus holding the tire valve and the valve 8 open.

It is understood that changes may be made in the design of the parts and in the relative arrangement or details of construction, without departing from the spirit of the invention, provided such changes are not outside of the scope of the following claims:

What I claim to secure by Letters Patent is:

1. In a device of the class described, the combination of a cylindrical member for attachment to a tire valve nipple, a second cylindrical member telescopically engaging the first-named member and provided with a valve, a pressure gauge carried by said second-named member, the parts being so arranged that the second member may be moved over the first member for unseating the usual tire valve and opening the valve of the first-named member to place the gauge in air communication with the tire.

2. In a device of the class described, the combination of two tubular telescopic members, one of said members being provided for connection with the usual tire valve nipple, and having a valve seat therein, the other of said members being provided with a valve to engage said seat, and also with a tire air pressure gauge.

3. In a device of the class described, the combination of a tubular member arranged for attachment to a tire valve nipple and provided at its upper portion with a valve seat, a second member telescopically sliding over the first-named member and having a stem carrying a valve to fit said seat, said stem being furthermore arranged for engagement with the tire air valve stem to open the latter, the upper portion of the second-named portion being formed as a cylinder, a piston fitting said cylinder and a spring compressed between said cylinder and piston, said piston having a stem provided with air pressure gauge indicating means.

4. In a device of the class described, the combination of a member arranged for attachment to a tire valve stem and provided with a valve seat, a second member telescopically engaging the first member and having a partition to which is secured a plunger carrying a valve to engage said seat, a spiral spring confined between said partition and valve seat, the upper portion of said second member being formed especially to contain the piston of a tire pressure gauge, said piston having a stem provided with a bore, and formed for connection with an inflating device for a tire, the parts being so arranged that the passage for conveying the air through the piston is in alinement with the telescopic members.

5. In a device of the class described, the combination of a member adapted to be secured to a tire valve nipple and provided with a valve seat, a second member telescopically slidable upon said first member and having a perforated partition provided with a plunger carrying a valve to engage said seat, said seat and plunger provided with a registering aperture and projection, a spiral spring for maintaining said valve normally seated, and a tire air pressure gauge comprising a piston and indicating means, said piston slidable in said second-named member and being held against air pressure by a spring, the extension of the piston stem being adapted for connection with an inflating device.

6. In a device of the class described, the combination of a member adapted to be attached to a tire valve nipple and provided with a valve seat, a second member telescopically sliding over said first member and provided with a perforated partition, a plunger, and a spring pressed valve, the latter to engage said seat, the upper portion of said second member forming a cylinder, a tire pressure gauge piston movable in said cylinder, and means for holding said valve open during inflation and comprising a registering aperture and projection in the valve seat and valve plunger.

In testimony whereof I have hereunto set my hand this third day of October, A. D. 1922.

WILMAR F. LENT.